US012802453B2

(12) United States Patent
Carrion et al.

(10) Patent No.: US 12,802,453 B2

(45) Date of Patent: Nov. 17, 2026

(54) IMAGE-ACQUIRING SYSTEM FOR A TRAFFIC-ENFORCEMENT MACHINE

(71) Applicant: IDEMIA ROAD SAFETY FRANCE, Courbevoie (FR)

(72) Inventors: Grégoire Carrion, Courbevoie (FR); Samuel Alliot, Courbevoie (FR); Stéphane Bonnot, Courbevoie (FR); Rachid Harbi, Courbevoie (FR)

(73) Assignee: IDEMIA ROAD SAFETY FRANCE, Courbevoie (FR)

( * ) Notice: Subject to any disclaimer, the term of this patent is extended or adjusted under 35 U.S.C. 154(b) by 0 days.

(21) Appl. No.: 19/175,184

(22) Filed: Apr. 10, 2025

(65) Prior Publication Data

US 2025/0371886 A1 Dec. 4, 2025

(30) Foreign Application Priority Data

Jun. 3, 2024 (FR) ....................................... 2405791

(51) Int. Cl.

*G06V 20/54* (2022.01)

*G06T 7/20* (2017.01)

(Continued)

(52) U.S. Cl.

CPC ................ *G06V 20/54* (2022.01); *G06T 7/20* (2013.01); *G06T 7/70* (2017.01); *G06V 10/764* (2022.01);

(Continued)

(58) Field of Classification Search

CPC ...... G06V 20/54; G06V 10/764; G06V 40/20; G06V 2201/07; G06V 2201/08;

(Continued)

(56) References Cited

U.S. PATENT DOCUMENTS

| | | | | |
|---|---|---|---|---|
| 5,809,161 A * | 9/1998 | Auty | G08G 1/054 382/104 |
| 6,121,898 A * | 9/2000 | Moetteli | G08G 1/052 340/936 |

(Continued)

OTHER PUBLICATIONS

Preliminary French Search Report & Written Opinion mailed Nov. 29, 2024 in FR2405791 filed Jun. 3, 2024, 10 pages.

*Primary Examiner* — Timothy R Newlin

(74) *Attorney, Agent, or Firm* — Oblon, McClelland, Maier & Neustadt, L.L.P.

(57) ABSTRACT

An image-acquiring system for a traffic-enforcement machine is configured to measure the path, position and speed of at least one vehicle using a device for tracking road vehicles; illuminate the vehicle using a device for providing infrared illumination; acquire, using a camera sensitive to infrared radiation, at least one infrared image of the vehicle illuminated by the device for providing infrared illumination; and process the infrared image of said vehicle using a data-processing device. The system is also configured to, when the speed of the vehicle, position of the vehicle, category of the vehicle, and/or a behavior of the driver meet/meets at least one infringement criterion, illuminate the vehicle using a device for providing lighting in the visible and acquire a color image of the illuminated vehicle using a photographic device for taking color photographs.

12 Claims, 3 Drawing Sheets

(51) Int. Cl.
*G06T 7/70* (2017.01)
*G06V 10/764* (2022.01)
*G06V 40/20* (2022.01)
*H04N 23/11* (2023.01)

(52) U.S. Cl.
CPC ............. *G06V 40/20* (2022.01); *H04N 23/11* (2023.01); *G06V 2201/07* (2022.01)

(58) Field of Classification Search
CPC .. G06V 10/82; G06T 7/20; G06T 7/70; H04N 23/11; G08G 1/0175; G08G 1/04; G08G 1/054
See application file for complete search history.

(56) References Cited

U.S. PATENT DOCUMENTS

| | | | | |
|---|---|---|---|---|
| 8,294,595 | B1 * | 10/2012 | Plotke | G08G 1/054 340/441 |
| 8,379,926 | B2 * | 2/2013 | Kanhere | G06V 20/54 382/104 |
| 9,641,806 | B2 * | 5/2017 | Smith | G08G 1/0175 |
| 11,651,601 | B1 * | 5/2023 | Young | G06V 20/54 348/149 |
| 2003/0174865 | A1 * | 9/2003 | Vernon | G08G 1/054 382/105 |
| 2006/0269104 | A1 * | 11/2006 | Ciolli | G08G 1/052 382/104 |
| 2008/0036623 | A1 * | 2/2008 | Rosen | H04M 3/42357 340/936 |
| 2012/0286988 | A1 * | 11/2012 | Sepehri | G01S 13/589 342/55 |
| 2014/0159925 | A1 * | 6/2014 | Mimeault | G01S 7/484 340/935 |
| 2014/0267725 | A1 * | 9/2014 | Smith | G08G 1/0175 348/148 |
| 2016/0232410 | A1 * | 8/2016 | Kelly | G06V 30/224 |
| 2018/0096595 | A1 * | 4/2018 | Janzen | G06V 10/94 |
| 2018/0268238 | A1 * | 9/2018 | Khan | G06V 10/751 |
| 2019/0188505 | A1 * | 6/2019 | Madkor | G08G 1/0141 |
| 2021/0124966 | A1 * | 4/2021 | Blais-Morin | G06V 10/751 |
| 2021/0358297 | A1 * | 11/2021 | Masumoto | G08G 1/054 |
| 2023/0144434 | A1 * | 5/2023 | Song | H04N 23/11 382/105 |
| 2023/0419532 | A1 * | 12/2023 | Strunz | G06N 3/084 |

* cited by examiner

IMAGE-ACQUIRING SYSTEM FOR A TRAFFIC-ENFORCEMENT MACHINE

TECHNICAL FIELD

The present invention relates to an image-acquiring system and method for a traffic-enforcement machine.

TECHNICAL BACKGROUND

It is common practice to control or monitor road traffic using machines comprising speed sensors—radar or laser devices for measuring the speed and position of vehicles—and optical systems configured to acquire images of the interior and/or exterior of vehicles. These machines are programmed to detect and characterize certain traffic offences committed by the drivers of vehicles via combined analysis of signals of the speed sensors and of the acquired images. They in particular make it possible to gather evidence with a view to classifying and proving the offence, and to extract from the images information such as registration numbers allowing the owner of the offending vehicle to be identified, for the purpose of issuance of a traffic ticket.

The reliability of these machines is partly based on acquisition of images of a quality allowing identification of elements relevant to characterization of the offence. This identification must be unambiguous regardless of the meteorological or light conditions under which the images are acquired. It is thus essential for the optical systems of traffic-enforcement machines to deliver, day and night, in good weather or in bad weather, the best possible optical performance, in order to ensure a perfect match between the data of the speed sensors and the images acquired by these systems for each vehicle scrutinized.

To this end, it is common practice to equip image-acquiring systems with a luminous device for producing high-brightness lighting capable of illuminating a vehicle for a short time, typically between a few thousandths to a few hundredths of a second, in order to freeze its movement and/or compensate for poor light conditions unsuitable for taking a photographic image of the vehicle at the moment when commits the offence. This lighting device, which is commonly called a “camera flash”, or simply a “flash”, is particularly advantageous under degraded ambient light conditions and in particular at night or during bad weather. It also makes it possible to obtain a color image of the vehicle whatever the ambient light conditions. A color image generally allows better identification of the vehicle and is sometimes required by certain legislations for an offence to be alleged.

GB 2272305 A [RICOH KK [JP]] 11 May 1994 describes an image-acquiring system for a traffic-enforcement machine, allowing photographs of a vehicle committing an offence such as speeding to be acquired at various magnifications and at various viewing angles. The system comprises a strobe flash allowing the vehicle to be illuminated during the acquisition of the photographs.

EP 2 157 558 A1 [JENOPTIK ROBOT GMBH] 24 Feb. 2010 describes a traffic-enforcement method and system in which the brightness with which vehicles are illuminated during scrutiny varies depending on their position on the roadway. This method and system allow the visibility of elements relevant to characterization of the offence to be improved, power consumption to be optimized and the lifespan of the flash bulbs used for the illumination to be increased.

WO 2020/014731 A1 [ACUSENSUS PTY LTD [AU]] 23 Jan. 2020 describes a traffic-enforcement system comprising a flash configured to illuminate an offending vehicle in a narrow interval of the electromagnetic spectrum between 700 and 1000 nm. This type of illumination makes it possible to decrease the negative consequences of glare during acquisition of an image of the vehicle, and to obtain better visibility of the interior of the passenger compartment of the vehicle.

It is also common practice to equip image-acquiring systems for a traffic-enforcement machine with an image-acquiring device sensitive to infrared radiation, either instead of or in addition to the device for acquiring images in the visible. The advantage of using an image-acquiring device sensitive to infrared radiation is its ability to reveal certain particular elements of the vehicle or of its driver that devices for acquiring images in the visible make it difficult to see, in particular under degraded ambient light conditions. Among these elements, mention may be made of the registration number of the vehicle or the interior of its passenger compartment. Infrared images may also be processed digitally with a view to computing vehicle speed.

CN 101770692 A [UNIV JILIANG CHINA] 7 Jul. 2010 describes a system for detecting the speed of an offending vehicle comprising an illuminating device employing near-infrared radiation and an image-acquiring device sensitive to said radiation. This system makes it possible to avoid using a detecting system based on a device for providing flash lighting in the visible, and there is thus not only no need to use flash bulbs the lifespan of which is generally short but also no need to run the risk of subjecting drivers to discomfort glare.

WO 2010/085931 A1 [JENOPTIK ROBOT GMBH [DE]] 5 Aug. 2010 describes a system for measuring the speed of a vehicle on a section of road. The system comprises two infrared cameras that are each located at an opposite end of the section, the cameras being configured to acquire an image of the license plate of a vehicle. Each camera is associated with a timer, allowing the speed of the vehicle to be computed. The system further comprises a camera sensitive to visible light and a device for providing flash lighting in the visible, with a view to acquiring a color image of the vehicle if its speed exceeds the permitted limit.

US 2013/191014 A1 [XEROX CORP [US]] 25 Jul. 2013 describes a speed-measuring method for a traffic-enforcement machine, said method being based on digital processing of a plurality of infrared images of a vehicle, said plurality of infrared images being acquired at a given frequency. Speed is computed based on an estimate of the movement of a wheel of the vehicle between two successive images.

WO 2014/163892 A1 [3M INNOVATIVE PROPERTIES CO [US]] 9 Oct. 2014 describes a system for measuring the speed of a vehicle on a section of road. The system comprises two infrared cameras that are each located at an opposite end of the section and that are configured to acquire an image of the license plate of a vehicle and to compute its speed based on a difference between timestamps. The system further comprises a camera sensitive to visible light and a device for providing flash lighting in the visible, with a view to acquiring a color image of the vehicle if its speed exceeds the permitted limit.

WO 2017/006583 A1 [OMRON TATEISI ELECTRONICS CO [JP]] 12 Jan. 2017 describes a traffic-enforcement system configured to acquire monochrome images of offending vehicles under infrared illumination. The monochrome images are subsequently colored through application of an RGB color model in which the brightness of each of the red, green and blue colors is associated with a range of the infrared electromagnetic spectrum.

WO 2019/137385 A1 [UNIV HEFEI NORMAL [CN]] 18 Jul. 2019 describes a system for detecting vehicle speed comprising a camera sensitive to infrared radiation, a camera sensitive to visible light, a device for providing lighting in the visible, and a photosensitive sensor. The system has two modes of operation depending on the ambient light conditions: a first mode suitable for degraded ambient light conditions in which only the camera sensitive to infrared radiation is used to acquire images of speeding vehicles; a second mode suitable for optimum ambient light conditions in which only the camera sensitive to visible light is used to acquire images. The device for providing lighting in the visible is used in the second embodiment to provide additional illumination if required. This system allows power consumption to be decreased, the lifespan of its components to be increased and the risk of a high-brightness flash causing drivers discomfort glare to be reduced.

EP 4 261 803 A1 [ROADIA GMBH [DE]] 18.10.2023 describes a method and system for measuring the speed of vehicles on a road based on an analysis of the direction of velocities computed for a vehicle by processing a plurality of images of said vehicle. The system comprises a flash to improve image quality.

SUMMARY OF THE INVENTION

Technical Problem

The nature of the conduct and the conditions under which it must be witnessed in order for a traffic-enforcement machine to provide proof that a vehicle has committed an offence are generally specified by the laws and regulations in force in the countries, cities or regions in which said machine is deployed. They may therefore vary from one country, region or city to another.

Thus, certain laws and/or regulations require, for an alleged offence to be legally admissible, that a color photograph of the vehicle in question be provided, the color photograph then being considered a piece of evidence of the offence, allowing the vehicle to be unambiguously identified.

It is well known that a color photograph of sufficient quality to allow clear and unambiguous identification of the elements necessary to allege an offence can only be acquired if a lighting or illuminating device of sufficient brightness is employed, in particular when ambient light conditions are degraded, as for example at night. Image-acquiring systems and devices using only or principally cameras and lighting devices operating in the infrared electromagnetic spectrum, including those involving retrospective image coloring, are unable to meet such a requirement.

Furthermore, the restrictions imposed by road traffic laws and/or regulations may vary depending on the type or category of the driven vehicle and/or the area in which they are liable to be driven. By way of example, speed limits and/or limits on lane changes may differ depending on the tonnage and/or gauge of the vehicle: vehicles with a weight of 3.5 tonnes or more may be subject to a lower speed limit than other vehicles of lower weight and be prohibited from changing lane to overtake on certain road sections. According to other examples, certain authorities may prohibit, permanently or within a given time range, certain types of vehicles from driving through certain urban areas, in the context of urban pollution management.

Now, although traffic enforcement is increasingly carried out by machines, they however still fail to opportunely acquire images in a manner useful to enforcement of restrictions on a given category of vehicle or on a given driver behavior. In other words, they are unable to discriminate positively on the basis of vehicle category and/or the type of offence committed. Generally, they systematically acquire images when an offence is witnessed, regardless of whether or not it concerns the category of vehicle in question. Furthermore, certain categories of vehicles may very rarely be subjected to scrutiny, for example vehicles for which the speed limit is lower than the speed limit of another category of vehicle.

Three major drawbacks arise from this situation. Firstly, subsequent processing of offences detected by traffic-enforcement machines is necessary in order to eliminate those that should not have been. Secondly, certain categories of vehicles may escape scrutiny due to limitations specific to the machine. Thirdly, in the context of traffic-enforcement machines using devices to take color photographs under visible light, flash lighting devices are used excessively and needlessly, resulting in a higher power consumption, a decrease in the lifespan of said device and an increased risk of subjecting drivers to unintentional and unnecessary discomfort glare, in particular under degraded ambient light conditions and/or in case of bad weather.

There is therefore a need for a versatile image-acquiring system for a traffic-enforcement machine capable of providing a quality color photograph of any vehicle that, according to the laws and/or regulations applicable to each category of vehicle, is committing an offence, while decreasing unnecessary use of flash lighting devices and the risk of subjecting drivers to discomfort glare.

Technical Solution

According to a first aspect of the invention, an image-acquiring system for a traffic-enforcement machine as described in claim 1 is provided, the dependent claims being advantageous embodiments.

According to a second aspect of the invention, an image-acquiring method for a traffic-enforcement machine as described in claim 11 is provided, the dependent claims being advantageous embodiments.

DETAILED DESCRIPTION OF EMBODIMENTS

In the context of the present invention, what is meant by "category" of vehicles is a category representative of a distinctive characteristic of a type of vehicle, in particular its size (height and/or length), weight, number of axles and/or type of powertrain. For example, in France, a category may be one of the eight main vehicle categories, or one of their sub-categories, as defined in Article R311-1 of the Code de la Route in force on 15 May 2024.

Figure 1:
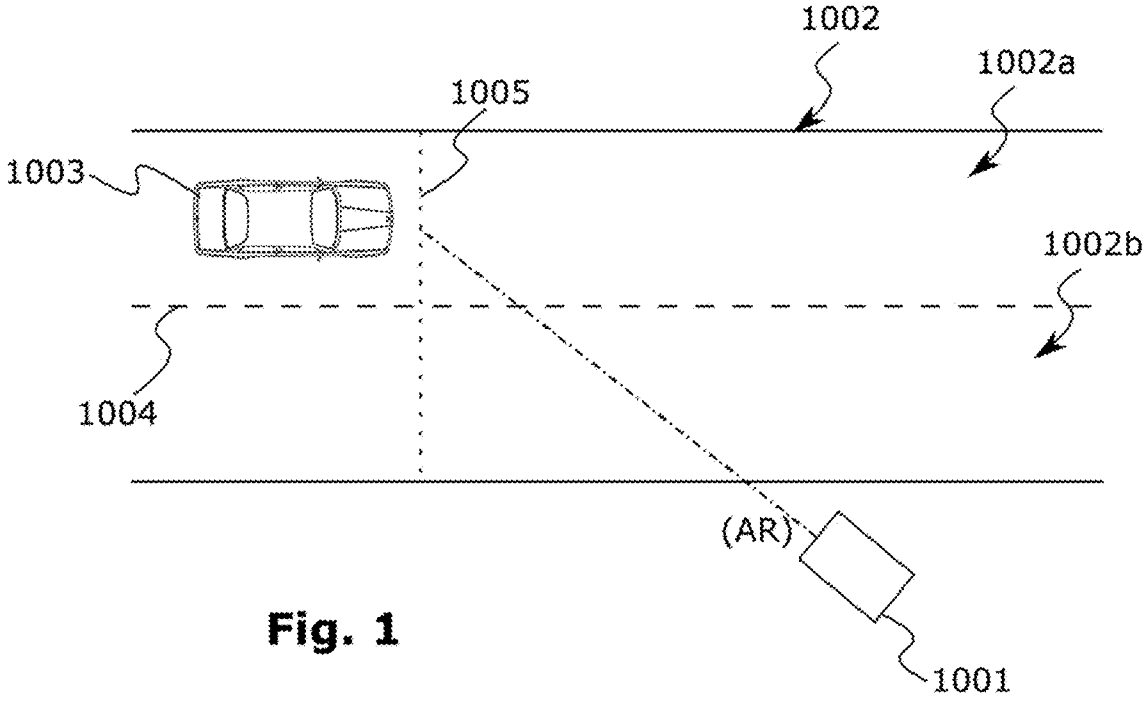
FIG. 1 is a schematic representation of a road scrutinized by means of a traffic-enforcement unit.

With reference to FIG. 1, for example, a traffic-enforcement machine 1001 is positioned near a road 1002 on which a vehicle 1003 is being driven. Equivalently, the traffic-enforcement machine 1001 may be mounted on a bridge or a gantry crossing the road 1002 or on a scaffold. The road 1002 may be any type of road space allowing vehicles to be driven, for example a freeway, a street, a highway, etc. Preferably, the road 1002 has at least two traffic lanes 1002*a*, 1002*b*. The traffic lanes 1002*a*, 1002*b* are generally bounded by markings applied to the surface of the road 1002. These markings are generally formed from markers consisting of visual signs such as a continuous line, a broken line, or even studs.

The traffic-enforcement machine 1001 is generally fixed with respect to the traffic lanes 1002*a*, 1002*b* of the road 1002. It is located at a defined distance from the edge of the road in order to obtain a sufficient field of view. It is preferably placed at a height greater than 1.2 m, or even greater than 2 m, or even greater than 3 m. To this end, the traffic-enforcement machine 1001 may be placed on a mast or a scaffold (not shown). Placing the traffic-enforcement machine 1001 at height makes it possible to limit masking of the fields of detection of the speed sensor and of the optical systems of the traffic-enforcement machine 1001.

In general, in the context of speed enforcement, the traffic-enforcement machine 1001 is oriented toward an infringement line 1005 that acts as a reference line. This infringement line 1005 is generally a virtual line the position of which is defined during installation of the traffic-enforcement machine 1001. In the context of enforcement of crossing of a yield line, such as a stop line or a line at a set of traffic lights, the infringement line 1005 is often a road line marking.

Figure 2:
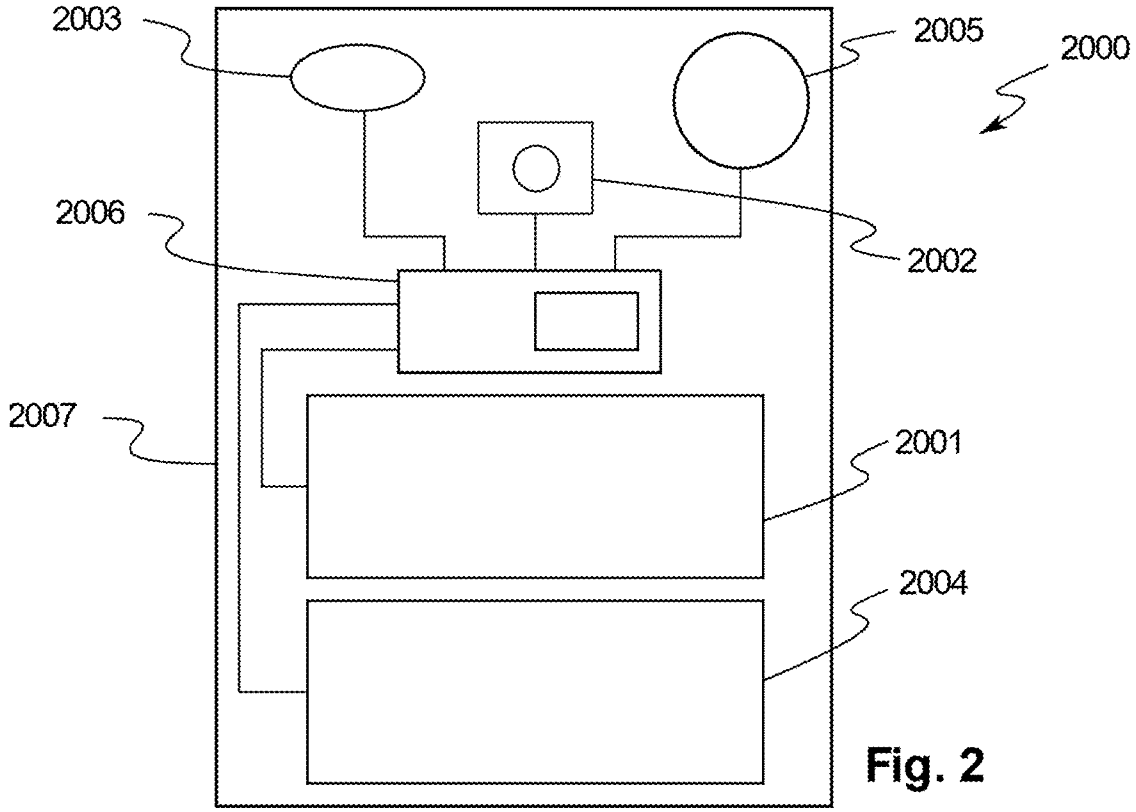
FIG. 2 is a schematic representation of the structure of an image-acquiring system for a traffic-enforcement machine according to the invention.
Figure 3:
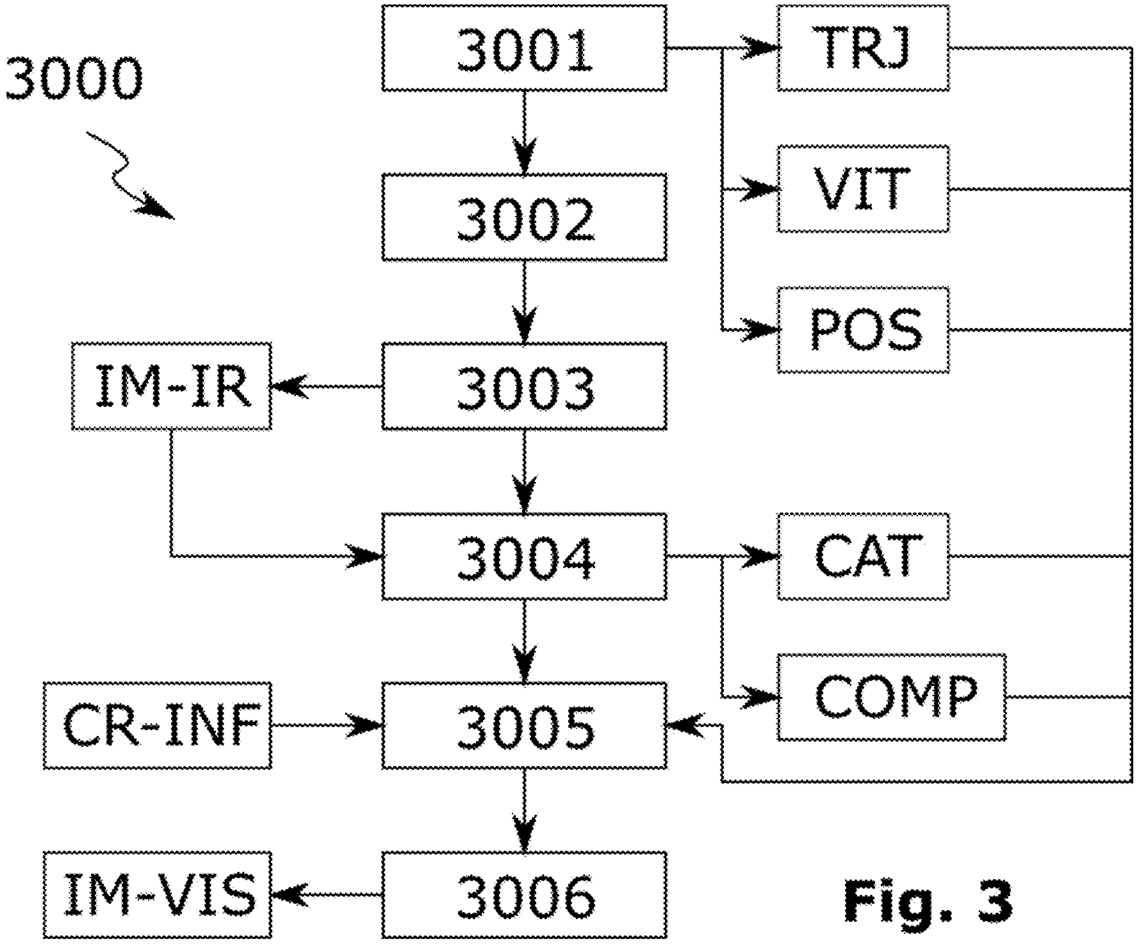
FIG. 3 is a flow diagram of an image-acquiring system for a traffic-enforcement machine according to the invention.

According to a first aspect of the invention, with reference to FIGS. 2 & 3, an image-acquiring system 2000 for a traffic-enforcement machine 1001 is provided, this image-acquiring system comprising:

a device 2001 for providing infrared illumination;
a camera 2002 sensitive to infrared radiation;
a device 2003 for tracking road vehicles;
a device 2004 for providing flash lighting in the visible;
a photographic device 2005 for taking color photographs;
a data-processing device 2006 configured to process the infrared images IM-IR acquired by the camera 2002 sensitive to infrared radiation by applying a first classification algorithm ALG-1 trained beforehand to detect vehicles 1003, said algorithm further being trained beforehand to classify the vehicles 1003 according to their category CAT, and/or classify one or more behaviors COMP of the drivers of the vehicles 1003;
the system 2000 is configured to carry out the following steps:

(a) measuring 3001 the path TRJ, position POS and speed VIT of at least one vehicle 1003 using the device 2003 for tracking road vehicles;
(b) illuminating 3002 the vehicle 1003 using the device 2001 for providing infrared illumination;
(c) acquiring 3003, using the camera 2002 sensitive to infrared radiation, at least one infrared image IM-IR of the vehicle 1003 illuminated by the device 2001 for providing infrared illumination;
(d) processing 3004 the infrared image IM-IR of said vehicle 1003 using the data-processing device 2006;

when the speed VIT of the vehicle, position POS of the vehicle, category CAT of the vehicle, and/or a behavior COMP of the driver meet/meets at least one infringement criterion CR-INF:

(e) illuminating 3005 the vehicle using the device for providing lighting in the visible;
(f) acquiring 3006 a color image IM-VIS of the illuminated vehicle 1003 using the photographic device 2005 for taking color photographs.

By infringement criterion CRIT-INF, what is meant is any infringement criterion capable of being defined on the basis of laws and/or regulations concerning prohibitions and restrictions affecting the speed VIT of the vehicle, the position POS of the vehicle, the category CAT of the vehicle, and/or the behavior COMP of a driver at the site of installation of the traffic-enforcement machine 1001.

The processing device 2006 may be of any suitable type. In particular, it may be an electronic circuit of the controller type. The electronic circuit may comprise one or more central processing units (CPUs) and/or one or more graphics processing units (GPUs). It may also comprise other electronic components such as input/output interfaces, non-volatile or volatile storage devices, and communication buses for transferring data between the internal components of the device or with external components. One of the input/output devices may be a user interface for human-machine interaction, for example a graphical user interface for displaying information which is understandable to humans, during a maintenance operation.

The data-processing device 2006 may implement tasks assigned to it by executing a computer program. This program comprises instructions that, when the program is executed by the data-processing device, cause the latter to implement the configuring method. The computer program may comprise instructions written in any type of compiled or interpreted programming language.

According to certain advantageous embodiments, an infringement criterion CR-INF in respect of the speed VIT of the vehicle 1003 is exceedance of the maximum speed permitted for one or more categories CAT of vehicles 1003. For example, in France, in the case where the law requires a maximum road speed of 130 km/h for vehicles of category M1 (automobiles) or L (motorcycles) and a maximum speed of 90 km/h for vehicles of categories M2, M3 (busses), N and O (lorries and camper vans), the infringement criterion may be one of these limits applied to said categories.

One advantage of this embodiment is that it discriminates positively based on the category of vehicle and the maximum speed permitted for the category. Thus, a color image will be acquired only when the speed of a vehicle of a defined category is greater than the maximum speed permitted for the category of vehicle. An offence may thus be detected only for this category of vehicles; the machine does not acquire images of vehicles of other categories even if their speed is also greater than said maximum speed.

In addition to speed offences, the system according to the invention is suitable for characterizing other types of offences. Thus, according to certain advantageous embodiments, the infringement criterion CR-INF for the path TRJ and/or position POS of the vehicle 1003 is selected from illegal crossing of a yield line, non-compliance with stopping distances, non-compliance with a prohibition to drive in a defined geographical area, non-compliance with a prohibition to drive one or more categories of vehicle in a traffic lane, and illegal overtaking of one vehicle by another belonging to any of one or more categories of vehicle.

By way of example, unauthorized crossing of a yield line may be unauthorized crossing of a line at a set of traffic lights or a stop line such as encountered at a stop sign. A prohibition to drive in a defined geographical area may be a prohibition to drive certain vehicles considered polluting in certain low-emission urban areas or even a temporary traffic ban for safety and/or public-health reasons. The prohibition to drive one or more categories of vehicle in a traffic lane may be a ban on driving in traffic lanes reserved for certain categories of vehicles such as busses, taxis or certain electric vehicles.

The infringement criterion CR-INF may also relate to certain behaviors of drivers of vehicles, in particular when they are considered to be high-risk or dangerous by law. In this regard, according to certain embodiments, the criterion CR-INF in respect of the behavior COMP of the driver of the vehicle 1003 is selected from use of a prohibited device by the driver of the vehicle and not wearing individual safety equipment. Examples of an infringement criterion CR-INF relating to use of a prohibited device may be use by the driver of a mobile telecommunication device or any other electronic device liable to distract the driver, such as a cell phone, a tablet computer or even a television.

Although a registration number is not always required to identify the perpetrator of a traffic offence, most national laws nevertheless refer to this number as a means of identifying the owner of an offending vehicle when issuing a traffic ticket. Thus, according to certain advantageous embodiments, the first classification algorithm ALG-1 is further trained beforehand to extract the registration number of the vehicles from the infrared images.

Apart from allowing the owner of the offending vehicle to be identified, the extracted registration number may also be used to detect an offence when an infringement criterion applies to the number. Thus, according to certain preferred embodiments, the system is further configured to execute steps (e) and (f) when the registration number meets at least one infringement criterion CR-INF. For example, only a limited number of vehicles identified by their registration number may be permitted to drive in a defined geographical area, in particular an urban area. In other words, a list of vehicles identified by their registration number is drawn up beforehand, and only vehicles on this list are permitted to drive in the defined geographical area. Any vehicle driven though the site of operation of the machine and the number of which is not on the list of permitted vehicles is committing an offence; steps (e) and (f) are then executed. The list of registration numbers of vehicles permitted to drive may be of any suitable type. It may be a list of specifically permitted vehicles without regard to their category. It may also be a list of vehicles of one or more particular categories the registration number of which is associated with said categories, for example vehicles of category M1 (automobiles) in France, or vehicles having a specific type of powertrain, in particular an electric or hybrid powertrain.

Figure 4:
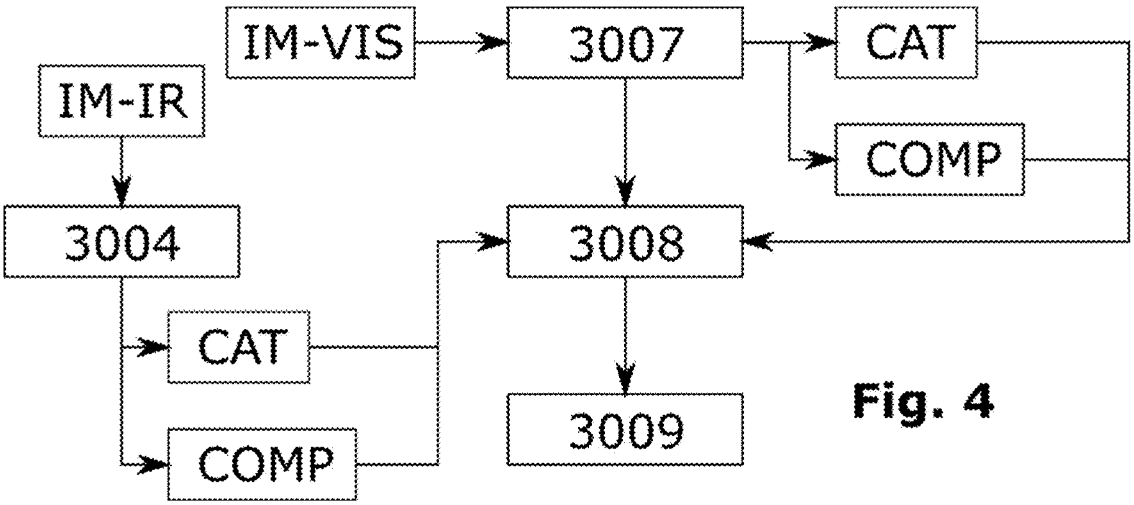
FIG. 4 is a flow diagram of an image-acquiring system for a traffic-enforcement machine according to certain embodiments.

Detection of an offence by a traffic-enforcement machine, in particular as regards detection of evidence allowing the offence to be classified, may sometimes fail or be marred by unacceptable errors making allegation of an offence legally invalid. Furthermore, certain laws or regulations may require evidence allowing the offence to be classified to be drawn from color images rather than infrared images. According to certain advantageous embodiments, with reference to FIG. 4, the data-processing device 2006 is further configured to carry out the following steps:

(g) processing 3007 the color image IM-VIS of the vehicle 1003 acquired using the photographic device 2005 by applying a second classification algorithm ALG-2 trained beforehand to detect, from said color images IM-VIS, the vehicles 1003, said algorithm further being trained beforehand to classify the vehicles according to their category CAT, and/or classify one or more behaviors COMP of the drivers of the vehicles 1003;

(h) comparing 3008 the information inferred during processing by the first algorithm ALG-1 with the information inferred during processing by the second classification algorithm ALG-2;

(i) validating 3009 the information inferred during processing by the first algorithm ALG-1 if said information matches the information inferred during processing by the second classification algorithm ALG-2.

The comparison of the information inferred by the two algorithms ALG-1 and ALG-2 ensures a double verification of the evidence allowing the offence to be alleged. The risk of errors is reduced, and because classification is also based on color images, the requirements of certain applicable laws or regulations are met.

To implement the invention, the first classification algorithm and/or second classification algorithm may be of any type suitable for classifying objects based on an analysis of images. In certain preferred embodiments, the first classification algorithm ALG-1 and/or the second classification algorithm ALG-2 are convolutional neural networks, preferably convolutional neural networks suitable for execution on embedded systems. Examples of convolutional neural networks are versions of the network MobileNet as described in Howard, Andrew G., et al. (2017) "Mobilenets: Efficient convolutional neural networks for mobile vision applications." arXiv preprint arXiv: 1704.04861; Sandler, Mark, et al. (2018) "Mobilenetv2: Inverted residuals and linear bottlenecks." Proceedings of the IEEE conference on computer vision and pattern recognition; Howard, Andrew, et al. (2019) "Searching for mobilenetv3." Proceedings of the IEEE/CVF international conference on computer vision; Qin, Danfeng, et al. (2024) "MobileNetV4-Universal Models for the Mobile Ecosystem." arXiv preprint arXiv: 2404.10518.

According to a first example, which is particularly suitable for embodiments in which an infringement criterion CR-INF in respect of the speed VIT of the vehicle 1003 is the exceedance of the speed limit of one or more categories (CAT) of vehicles 1003, the first classification algorithm ALG-1 is a MobileNetv2 convolutional neural network. The network is trained beforehand on a set of images of road vehicles classed into 13 categories. The training set may comprise a substantially similar number of infrared or visible images of vehicles for each category. Alternatively, it may comprise a different number of images for each category, this number being representative of the frequency with which vehicles of each category are driven in the traffic lane in question. By way of example, on a traffic lane where vehicles of category N or O (heavy goods vehicles) according to French law represent 40% of the road traffic, the training set may consist of at least 40% images of this category.

According to a second example, particularly suitable for embodiments in which the criterion CR-INF in respect of the behavior COMP of the driver of the vehicle 1003 is selected from the use of a prohibited device by the driver of the vehicle and not wearing individual safety equipment, the first classification algorithm ALG-1 is a convolutional neural network comprising two modules.

A first module is configured to detect and delineate the portion of the images of vehicles corresponding to the driver. To this end, it may be trained beforehand on a set of training images comprising images of vehicles in which the portion of the image corresponding to the driver is annotated. A second module is configured to detect whether an offence is being committed or not. To this end, it may be trained beforehand on a set of training images comprising images of vehicles classed according to whether or not the drivers of vehicles are committing offences, such as use of a prohibited device, a cell phone for example, or wearing or not wearing safety equipment, a helmet in case of two-wheeled vehicles or a seatbelt for example.

The device 2003 for tracking road vehicles is any device suitable for measuring and configured to measure the position POS, path TRJ and/or speed VIT of road vehicles in the one or more traffic lanes where a traffic-enforcement machine is liable to be required.

The tracking device 2003 may in particular employ echoes and/or reflection of electromagnetic waves. According to preferred embodiments, the device 2003 for tracking vehicles 1003 comprises a rangefinder, preferably a lidar or radar rangefinder.

In addition or alternatively, the tracking device 2003 may be a device for acquiring and processing video images, configured to measure position POS, path TRJ and/or speed VIT on the basis of an analysis of said images. In this regard, according to certain embodiments, the device 2003 for tracking vehicles 1003 comprises a video-acquiring device configured to determine the position and path of the vehicles from a video.

According to a second aspect of the invention, with reference to FIG. 3, a method for acquiring images for a traffic-enforcement machine is provided, said method comprising the following steps:

(a) measuring 3001 the path TRJ, position POS and speed VIT of at least one vehicle 1003;

(b) illuminating 3002 the vehicle 1003 with infrared illumination;

(c) acquiring 3003 at least one infrared image IM-IR of the vehicle 1003 illuminated with said infrared illumination;

(d) processing 3004 the infrared image IM-IR of said vehicle 1003 by applying a first classification algorithm ALG-1 trained beforehand to detect vehicles 1003, said algorithm further being trained beforehand to classify the vehicles according to their category CAT, and/or classify one or more behaviors COMP of the drivers of the vehicles 1003;

when the speed VIT of the vehicle, position POS of the vehicle, category CAT of the vehicle 1003, and/or a behavior COMP of the driver meet/meets at least one infringement criterion:

(e) illuminating 3005 the vehicle 1003 with visible light;

(f) acquiring a color image IM-VIS of the vehicle 1003 illuminated with visible light.

A method according to the second aspect of the invention may in particular be implemented by the system according to the first aspect of the invention. All the embodiments described above regarding the system according to the first aspect of the invention apply, mutatis mutandis, to the method according to the second aspect of the invention.

In particular, according to certain preferred embodiments, the first classification algorithm ALG-1 is further trained beforehand to extract the registration number of the vehicles from the infrared images, and to execute steps (e) and (f) when the registration number meets at least one infringement criterion CRIT-INF.

According to certain preferred embodiments, the method further comprises the following steps:

(g) processing the color image IM-VIS of the vehicle 1003 by applying a second classification algorithm ALG-2 trained beforehand to detect, from said color images, the vehicles, said algorithm further being trained beforehand to classify the vehicles 1003 according to their category CAT, and/or classify one or more behaviors COMP of the drivers of the vehicles 1003;

(h) comparing the information inferred during processing by the first algorithm ALG-1 with the information inferred during processing by the second classification algorithm ALG-2;

(i) validating the information inferred during processing by the first algorithm ALG-1 if said information matches the information inferred during processing by the second classification algorithm ALG-2.

REFERENCES

Patent Literature

GB 2272305 A [RICOH KK [JP]] 11.05.1994.

EP 2 157 558 A1 [JENOPTIK ROBOT GMBH] 24 Feb. 2010.

CN 101770692 A [UNIV JILIANG CHINA] 7 Jul. 2010.

WO 2010/085931 A1 [JENOPTIK ROBOT GMBH [DE]] 5 Sep. 2010.

US 2013/191014 A1 [XEROX CORP [US]] 25 Jul. 2013.

WO 2014/163892 A1 [3M INNOVATIVE PROPERTIES CO [US]] 9 Dec. 2014.

WO 2017/006583 A1 [OMRON TATEISI ELECTRONICS CO [JP]] 12 Jan. 2017.

WO 2019/137385 A1 [UNIV HEFEI NORMAL [CN]] 18 Jul. 2019.

WO 2020/014731 A1 [ACUSENSUS PTY LTD [AU]] 23 Jan. 2020.

EP 4 261 803 A1 [ROADIA GMBH [DE]] 18 Oct. 2023.

Non-Patent Literature

Andrew G., et al. (2017) "Mobilenets: Efficient convolutional neural networks for mobile vision applications." arXiv preprint arXiv: 1704.04861.

Mark, et al. (2018) "Mobilenetv2: Inverted residuals and linear bottlenecks." Proceedings of the IEEE conference on computer vision and pattern recognition.

Howard, Andrew, et al. (2019) "Searching for mobilenetv3." Proceedings of the IEEE/CVF international conference on computer vision.

Qin, Danfeng, et al. (2024) "MobileNetV4-Universal Models for the Mobile Ecosystem." arXiv preprint arXiv: 2404.10518.

The invention claimed is:

1. An image-acquiring system for a traffic-enforcement machine, comprising:

a device for providing infrared illumination;

a camera sensitive to infrared radiation;

a device for tracking road vehicles;

a device for providing flash lighting in the visible range;

a photographic device for taking color photographs;

a data-processing device configured to process infrared images acquired by the camera sensitive to infrared radiation by applying a first classification algorithm trained beforehand to detect vehicles, the first classification algorithm further being trained beforehand to classify the vehicles according to a category, and/or classify one or more behaviors of drivers of the vehicles;

wherein the system is configured to:

(a) measure a path, position and speed of at least one vehicle using the device for tracking road vehicles;

(b) illuminate the at least one vehicle using the device for providing infrared illumination;

(c) acquire, using the camera sensitive to infrared radiation, at least one infrared image of the at least one vehicle illuminated by the device for providing infrared illumination;

(d) process the at least one infrared image of the at least one vehicle using the data-processing device; and when a speed of the at least one vehicle, position of the at least one vehicle, category of the at least one vehicle, and/or behavior of one of the drivers meet/meets at least one infringement criterion:

(e) illuminate the at least one vehicle using the device for providing lighting in the visible range; and (f) acquire a color image of the illuminated at least one vehicle using the photographic device for taking color photographs, wherein the data-processing device is further configured to:

(g) process the color image of the at least one vehicle acquired using the photographic device by applying a second classification algorithm trained beforehand to detect, from the color images, the vehicles, the second classification algorithm further being trained beforehand to classify the vehicles according to their category, and/or classify one or more behaviors of the drivers of the vehicles;

(h) compare information inferred during processing by the first classification algorithm with information inferred during processing by the second classification algorithm; and (i) validate the information inferred during processing by the first classification algorithm if the information inferred during processing by the first classification algorithm matches the information inferred during processing by the second classification algorithm.

2. The system as claimed in claim 1, wherein the infringement criterion in respect of the speed of the vehicle is exceedance of the maximum speed permitted for one or more categories of vehicles.

3. The system as claimed in claim 1, wherein the infringement criterion for the path and/or position of the vehicle is selected from illegal crossing of a yield line, non-compliance with stopping distances, non-compliance with a prohibition to drive in a defined geographical area, non-compliance with a prohibition to drive one or more categories of a vehicle in a traffic lane, and illegal overtaking of one vehicle by another belonging to any of one or more categories of vehicle.

4. The system as claimed in claim 1, wherein the criterion in respect of the behavior of one of the drivers is selected from use of a prohibited device by the one of the drivers and not wearing individual safety equipment.

5. The system as claimed in claim 1, wherein the first classification algorithm is further trained beforehand to extract a registration number of the vehicles from the infrared images.

6. The system as claimed in claim 5, wherein the system is further configured to execute (e) and (f) when the registration number meets at least one infringement criterion.

7. The system as claimed in claim 1, wherein the first classification algorithm and/or the second classification algorithm are convolutional neural networks.

8. The system as claimed in claim 1, wherein the device for tracking vehicles comprises a rangefinder.

9. The system as claimed in claim 1, wherein the device for tracking vehicles further comprises a video-acquiring device configured to determine the position and path of the vehicles from a video.

10. The system as claimed in claim 1, wherein the device for tracking vehicles comprises a lidar or radar rangefinder.

11. A method for acquiring images for a traffic-enforcement machine, said method comprising:

(a) measuring a path, position and speed of at least one vehicle;

(b) illuminating the at least one vehicle with infrared illumination;

(c) acquiring at least one infrared image of the at least one vehicle illuminated with said infrared illumination;

(d) processing the at least one infrared image of the at least one vehicle by applying a first classification algorithm trained beforehand to detect vehicles, the first classification algorithm further being trained beforehand to classify the vehicles according to a category, and/or classify one or more behaviors of drivers of the vehicles;

when the speed of the vehicle, position of the vehicle, category of the vehicle, and/or a behavior of one of the drivers meet/meets at least one infringement criterion:

(e) illuminating the at least one vehicle with visible light; and (f) acquiring a color image of the at least one vehicle illuminated with visible light, wherein the method further comprises:

(g) processing the color image of the at least one vehicle by applying a second classification algorithm trained beforehand to detect, from color images, the vehicles, the second classification algorithm further being trained beforehand to classify the vehicles according to a category, and/or classify one or more behaviors of the drivers of the vehicles;

(h) comparing information inferred during processing by the first classification algorithm with information inferred during processing by the second classification algorithm; and (i) validating the information inferred during processing by the first classification algorithm if the information inferred during processing by the first classification algorithm matches the information inferred during processing by the second classification algorithm.

12. The method as claimed in claim 11, wherein the first classification algorithm is further trained beforehand to extract a registration number of the vehicles from the infrared images, and to execute (e) and (f) when the registration number meets at least one infringement criterion.

* * * * *